June 13, 1950 L. N. YOHE 2,511,313
ICE CREAM FREEZER
Filed July 9, 1945 3 Sheets-Sheet 1
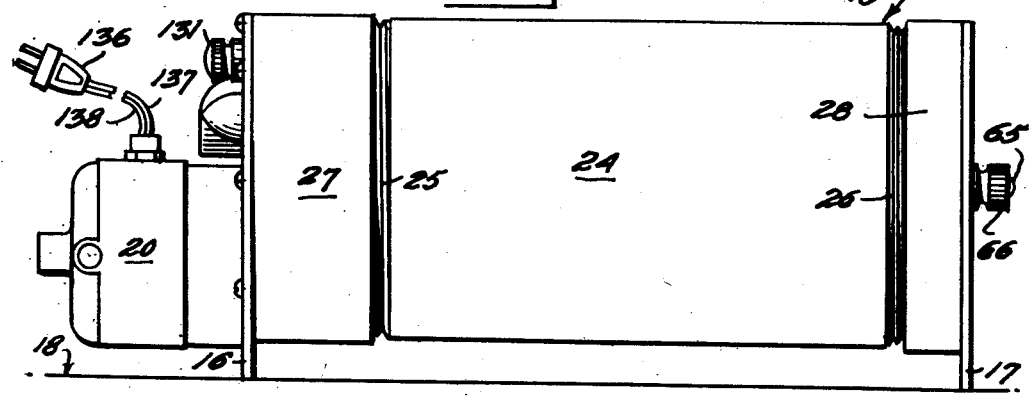
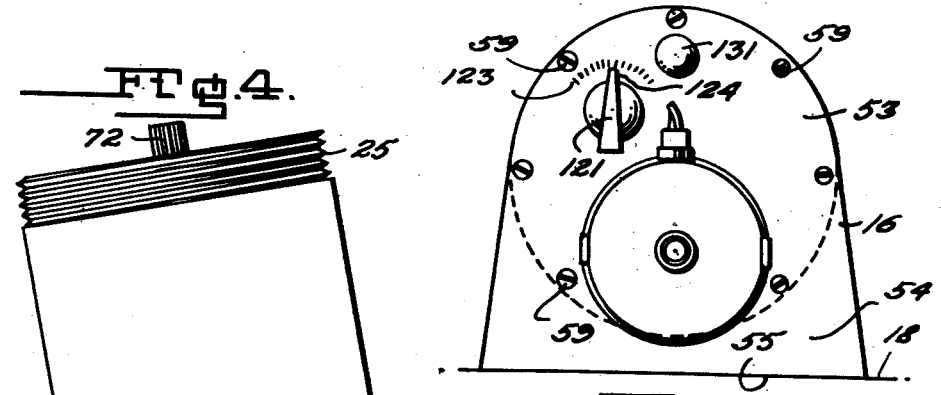
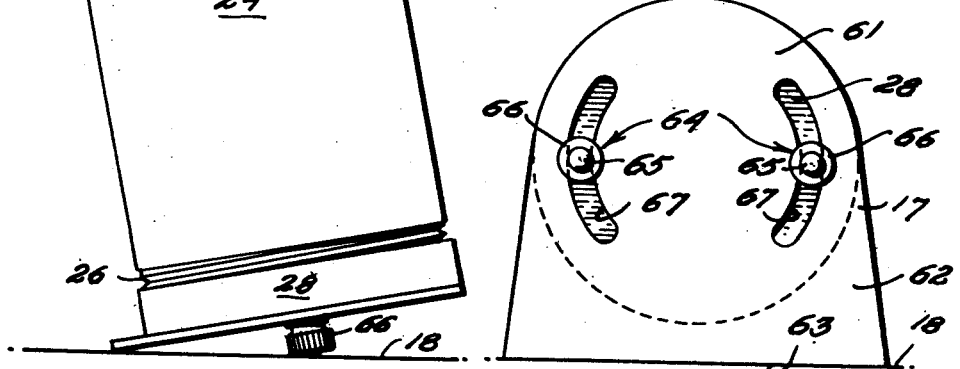
INVENTOR.
Lester N. Yohe
Lancaster, Allwine Rommel
ATTORNEYS June 13, 1950 L. N. YOHE 2,511,313
ICE CREAM FREEZER
Filed July 9, 1945 3 Sheets-Sheet 2
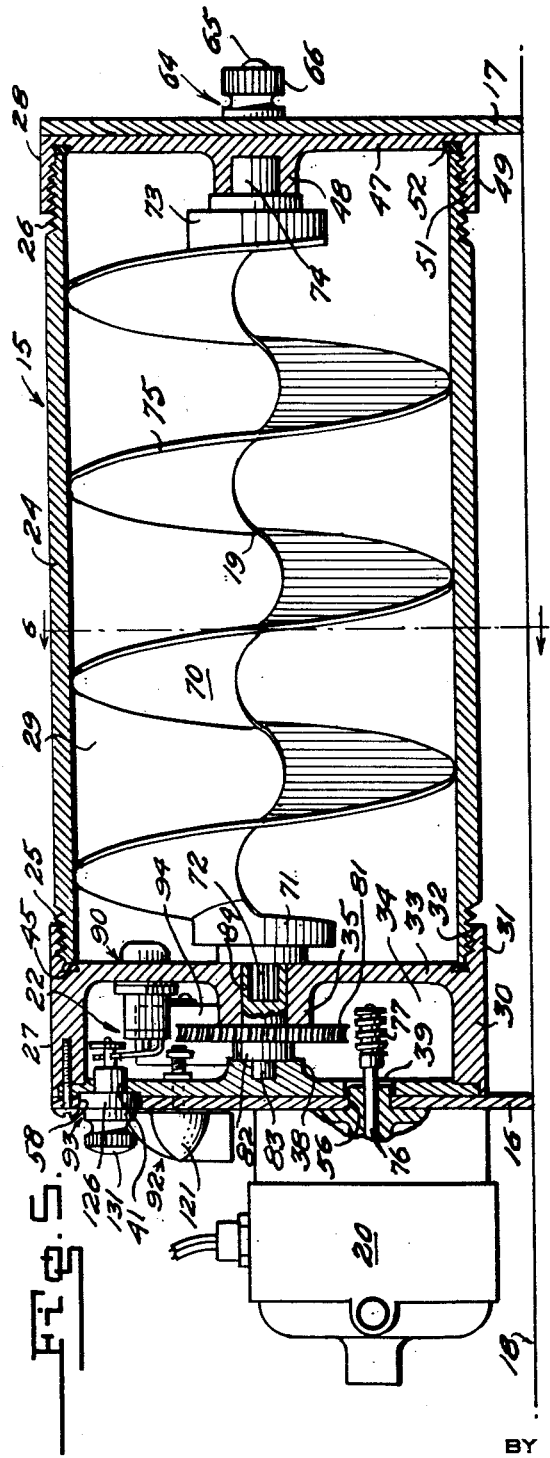
INVENTOR.
Lester N. Yohe
BY Lancaster, Allison Rommel
ATTORNEYS.

June 13, 1950 L. N. YOHE 2,511,313
ICE CREAM FREEZER
Filed July 9, 1945 3 Sheets-Sheet 3
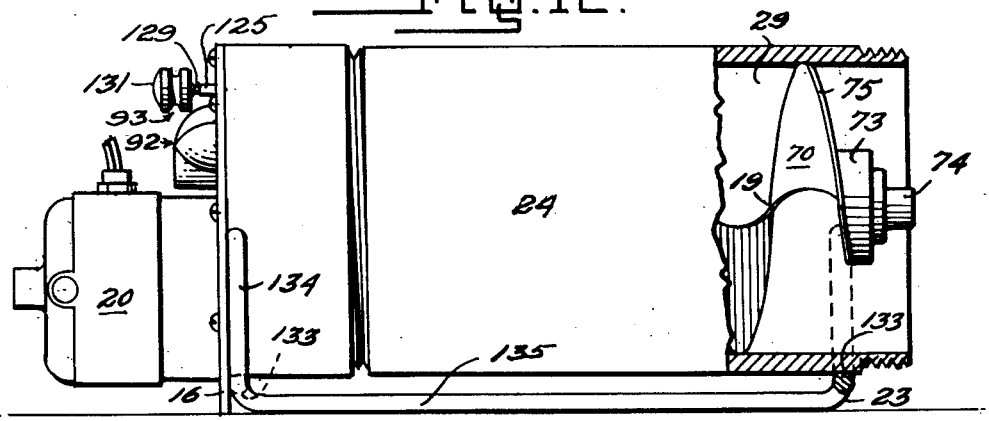
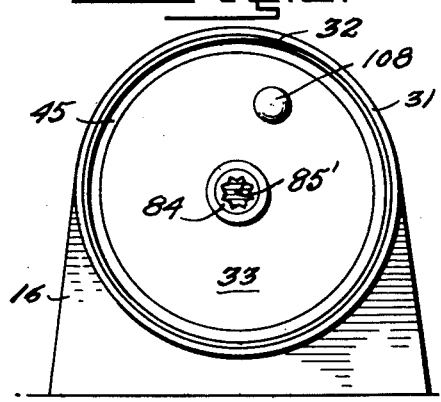
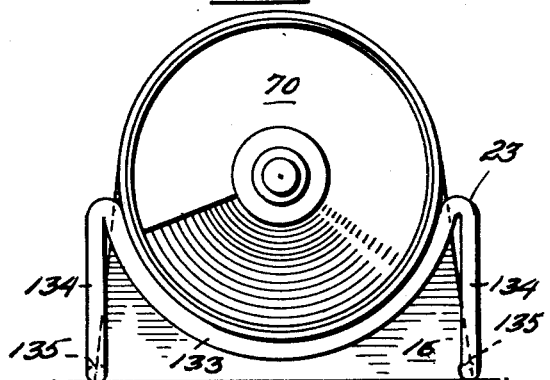
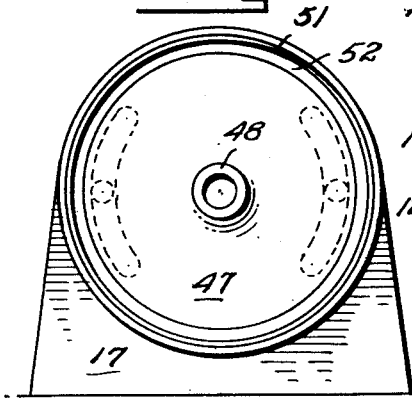
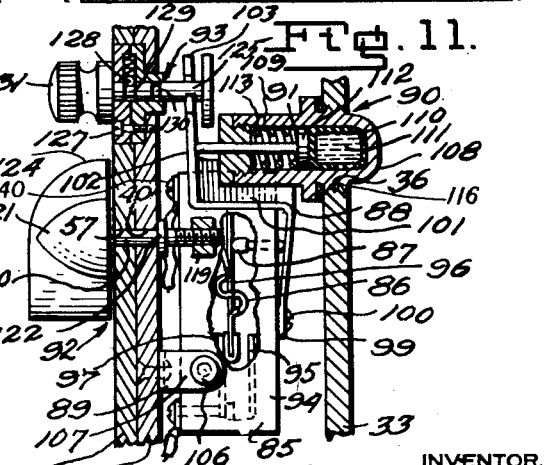
INVENTOR.
Lester N. Yohe
BY Lancaster, Allwine & Rommel
ATTORNEYS.

Patented June 13, 1950

2,511,313

UNITED STATES PATENT OFFICE 2,511,313

ICE-CREAM FREEZER

Lester N. Yohe, Upper Darby, Pa.

Application July 9, 1945, Serial No. 603,965

6 Claims. (Cl. 259—109)

The present invention relates to apparatus for freezing desserts or other edible mixtures, such as ice cream. It is particularly well adapted, but not necessarily limited to home use.

One of the principal objects of the invention is to provide electrically and thermostatically operated apparatus which may be used in the freezing compartment of an electric or gas operated refrigerator, or in the compartment of a quick-freeze unit or in an iced receptacle, and will be automatic in operation at least to the extent of bringing the fluid mixture to the desired smooth, frozen condition by agitation, then breaking the electric current used to operate the agitator and re-establishing the current if temperature of the edible mixture rises to or beyond that for which the apparatus is set.

Another object of the invention is to provide an improved agitator for a freezer of this character, which is simple in formation, easily cleaned, and assists in the provision of a very smooth edible mixture.

A further object of the invention is to provide apparatus of the character described in which the agitator is primarily intended to assist in providing a smooth edible mixture but may also be utilized to express the frozen mixture from the cylinder in which the mixture is frozen, thus avoiding the necessity of removing it with a spoon, scoop or other tool.

A still further object is to provide portable apparatus of this character, including an elongated cylinder which may be readily charged with the fluid mixture while remote from the freezing equipment, then sealed and placed in any desired position in the freezing equipment, such as in a vertical or horizontal position, and, when the mixture is frozen, may be removed from the freezing equipment and placed on a rack in a horizontal position where the frozen mixture may be expressed from an end of the cylinder by the motor and agitator, and readily cut off into portions while it is thus being expressed from the cylinder.

Other objects and advantages of the invention will appear in the following detailed description of the preferred embodiment of my invention, taken in connection with the accompanying drawings, forming a part of this specification, and in which drawings—

Fig. 1 is a side elevation of the freezer, with its axis horizontal.

Fig. 2 is a front end elevation of the freezer showing a support for the one end of the freezer cylinder.

Fig. 3 is a rear end elevation, showing a typical adjustable support for the other end of the freezer cylinder, when in a horizontal position.

Fig. 4 is a side elevation of the freezer cylinder, its one end cap and companion support in place, and the other cap and companion support removed, the parts being arranged with the axis of the cylinder upright for pouring the fluid edible mixture into the open upper end of the cylinder.

Fig. 5 is an enlarged view, partly in elevation and partly in vertical section longitudinally of the freezer.

Fig. 6 is a sectional view on the line 6—6 of Fig. 5, on a slightly reduced scale.

Fig. 7 is a view in elevation showing the support illustrated in Fig. 2, looking toward the inner face thereof, and transmission and control means carried thereby.

Fig. 8 is a view in elevation looking toward the cavity of a housing, on the front cap, for said transmission and control means.

Fig. 9 is a view in elevation of the front cap of the freezer cylinder, looking toward the inner face thereof.

Fig. 10 is a similar view but looking toward the inner face of the rear cap of the freezer cylinder.

Fig. 11 is an enlarged, detail view, partly in elevation and partly in vertical section of control mechanism shown in Figs. 5 and 7.

Fig. 12 is a view similar to Fig. 1, but showing the freezer mounted on a rack, the rear cap removed, and a portion of the freezer broken away to disclose the manner in which the agitator of the freezer may be used to express the frozen mixture from the cylinder.

Fig. 13 is a rear end elevation of the assembly shown in Fig. 12.

Fig. 14 is a typical electric wiring diagram.

The preferred embodiment of the freezer comprises an elongated container 15 for the edible mixture; a front support 16 and a rear support 17 whereby the container may be disposed on a horizontal surface 18, such as the top of a table, with the axis of the container horizontal; an agitator 19 in the container adapted to circulate the edible mixture longitudinally of the container; an electric motor 20; motion transmitting means 21 operatively connected with the motor and the agitator to impart movement of the former to the latter; thermostatic and manually operable electric switch mechanism 22 for the motor circuit; and, a stand 23 for use when the frozen mixture is being expressed from the container.

Referring first to the container 15, it preferably comprises a hollow cylindrical main body 24, having external screw threads 25 and 26 at its front and rear ends, respectively, a front end cap 27 and a rear end cap 28, thus providing a cylindrical cavity 29 for receiving the edible mixture to be frozen. The front end cap 27 preferably includes an annular body portion 30 having an integral annular attaching flange 31 provided with an internal screw thread 32 for engagement with the thread 25 of cylinder 24 and an integral closing wall 33 inwardly of the free edge of flange 31, thus providing a chamber 34, for parts of the thermostatic and manually operable electric switch mechanism 22, and the motion transmitting means 21, the closing wall having a central bearing 35 for a part of the latter, and a screw threaded opening 36 for a part of the mechanism 22. There is also provided an instrument wall 37 forming a part of the front end cap closing the chamber 34, this wall 37 being provided with a bearing 38 aligned with bearing 35, transverse openings 39, 40, 41 and 42 to accommodate parts of the means 21 and mechanism 22, and inwardly projecting spaced bearing lugs 43 and 44 for a part of the motion transmitting means 21. The closing wall 33 is provided with an annular gasket 45 at the inner end of flange 31 to engage the forward end of cylinder 24 and provide a tight seal when the cap 27 is in place, as shown in Fig. 5.

The rear end cap 28 comprises a closing wall 47 provided with a step bearing 48 axially aligned with bearings 35 and 38 and extending from its inner surface, an annular attaching flange 49 provided with an internal screw thread 51 for engagement with thread 26 of the cylinder 24, and an annular gasket 52 at the inner end of flange 49 to engage the rear end of cylinder 24 and provide a tight seal when the cap 28 is in place, as shown in Fig. 5.

Since it is desired to provide a freezer which may be disposed on a flat surface with the axis of the freezer horizontal, and guard against its tipping or rolling when in storage or on display, or when in the freezing compartment of a refrigerator, or when expressing the frozen mixture from the container, the support 16 is provided. It may be a plate having its major portion 53 shaped to conform with the wall 37 of cap 27 and a widened base 54 having a flat lower edge 55 to engage the flat surface 18. The major portion 53 is provided with openings 56, 57 and 58 aligning with the openings 39, 40 and 41, respectively of the wall 37 for a purpose to be subsequently set forth. The support 16 may be secured to the front end cap 27, by screws 59 and the wall 37 may be secured to support 16 by screws 60, which may also be used to secure the motor 20 to the support 16.

The rear end support 17 is similar to support 16 in that it comprises a major portion 61 shaped to conform with the wall 47 of cap 28 and a widened base 62 having a flat lower edge 63 to engage the flat surface 18. However the support 17 is preferably secured to cap 28, by adjusting means 64 shown in Figs. 1, 3 and 5 whereby the support may be adjusted about the axis of the container 15. This means may comprise two screw threaded studs 65 rigid with the cap 28, extending outwardly from its outer face and spaced equidistant from the axis of the cap and diametrically aligned, and two nuts 66 for the studs 65. The latter extend thru arcuate slots 67 in the support 17, these slots struck from a center of the major portion 61 and at a radius equal to the spacing of each stud from the axis of the cap 28. By this arrangement means is provided, cooperating with the support 16, for staple support of the container in a horizontal position and to compensate for wear or the degree of compression of the gaskets 45 and 52, resulting from removal and replacing of the caps 27 and 28 with respect to the cylinder 24, since, if the lower edges 55 and 63 are not in the same plane, when the caps are in place, the support 17 may be adjusted to accomplish this, by loosening the nuts 66, swinging the support 17 about the axis of the freezer, and subsequently tightening the nuts when the edges 55 and 56 are in the same plane.

The agitator 19 is of a character to circulate the edible mixture longitudinally of the elongated container 15 and comprises an open center screw or spiral body portion 70, a front hub 71 provided with a polygonal or multiple splined stub extension 72 for detachable coupled relation with the motion transmitting means 21, and a rear hub 73 provided with a cylindrical stub extension 74 received in bearing 48. In referring to the agitator 19 as having an open screw center body portion, the term "screw" is used to denote a characteristic similar to the cork penetrating portion of a cork screw, in that it comprises several spiral convolutions. The external peripheral edge 75 of the body portion 70 contacts the peripheral wall of the cavity 29, the direction of rotation of the agitator being clockwise, viewed from its rear end, so as to circulate the edible mixture toward cap 28 adjacent the cylinder wall and permit it to return toward the front cap 27 at the longitudinal central portion of the cylinder.

The electric motor 20 may be of any suitable type, including a drive shaft 76 which, in the example shown, extends thru the openings 39 and 56, into the chamber 34.

Any suitable motion transmitting means may be provided for imparting movement of the motor shaft 76 to the agitator 19. In the example shown it is of the speed reducing type and compactly arranged in the chamber 34. It comprises a worm 77 on shaft 76, a worm wheel 78 meshing therewith, mounted on a shaft 79 carried by the bearing lugs 43 and 44; a worm 80 on shaft 79 between the lugs 43 and 44, and a worm wheel 81, meshing with the worm 80, and provided with a hub 82 having a stub axle 83 supported by bearing 38 and a stub axle 84 received in bearing 35. The axle 84 has a multiple splined socket 85' for receiving the extension 72 of the agitator 19. Thus the front end cap 27 may be removed by unscrewing it from the cylinder 24, and the agitator removed or it may be permitted to remain in the cylinder, which can be stood on end, as shown in Fig. 4, to receive the edible mixture in fluid form. The rear end cap 28 may also be removed, as by unscrewing it from the cylinder 24, and the agitator remaining in the cylinder may be used to express the frozen edible from the cylinder as is obvious from a consideration of Fig. 12.

With reference to the thermostatic and manually operable electric switch mechanism, shown more in detail in Figs. 2. 5, 7, 8, 9 and 11, it preferably comprises a switch unit 85, for making and breaking the circuit of motor 20, including a contact arm 86 normally spring biased to an open circuit position, but movable to a closed circuit position upon depression of a plunger 87; an actuating arm 88 movably carried by the switch unit and bearing against the plunger 87; means 89 mounting the switch unit 85 in chamber 34 to be bodily movable toward and from the wall 33; a thermostatic means 90 carried by the wall 33 and including a plunger 91 bearing against the actuating arm 88, at the face thereof opposite to the face of the arm 88 that is in engagement with plunger 87; means 92 carried by the wall 37 and support 16 for bodily adjusting the position of the switch unit 85; and means 93 carried by the wall 37 and support 16 for manually imparting movement to the actuating arm 88 for closing the motor circuit, irrespective of the thermostatic means 90.

The switch unit 85 may be of any suitable type and in the example shown is similar to that disclosed in United States patent, McGall, No. 1,960,020, granted May 22, 1934. It includes an elongated casing 94 of insulating material in which is disposed the contact arm 86 yieldably disposed in contact with a stop 95 by means of a spring 96 which may be actuated by depression of the plunger 87. The plunger contacts the spring and extends toward the wall 33, so as to bring the contact arm into engagement with an electric contact 97 forming a part of the motor circuit, when the plunger is depressed. These are elements of many forms of snap switches of which McGall, supra, is an example.

The actuating arm 88, which cooperates with means 90 and 93 is preferably made of spring metal and in the example shown is of Z formation permitting a compact assembly, and includes a lower portion 99 secured to the casing 94 as by a screw 100, this lower portion engaging the plunger 87; offset portion 101 extending from portion 99 toward wall 37; and, upper portion 102 carried by offset 101 and substantially paralleling the plane of wall 37, the free end of portion 102 being bifurcated to provide tines 103 separated by a notch 104. Thus if the actuating arm 88 is pushed by the plunger 91 of means 90 toward the wall 37 it will depress plunger 87 and throw the contact arm 86 into engagement with contact 97 as shown in Fig. 11. If plunger 91 is retracted it will permit the actuating arm to move toward the wall 33 and spring 96 will throw the contact arm 86 out of engagement with contact 97.

The means 89 for movably mounting the switch unit 85 may comprise a bracket 105 secured to the wall 37 in any suitable manner, and a pivot 106 extending transversally thru the casing 94 at one end portion thereof, the pivot being carried by ears 107 of the bracket disposed at each side of the casing 94.

The thermostatic means 90 may be of any suitable character and in the example shown comprises a cylindrical casing 108 providing an elongated chamber 109 in which there is disposed, at one end, an elastic sack 110, such as of rubber, containing a substance 111, such as mercury, capable of contracting during change from high to low temperature, a piston-like portion 112 of plunger 91 engaging the sack 110, and a coil spring 113 engaging the portion 112 at its face opposite the sack 110 and abutting against a detachable cap 114 of the casing 108, thru which extends a stem 115 of plunger 91. The casing is preferably provided with an external screw thread 116 for engagement in the threaded opening 36 in wall 33, and a wrench receiving enlargement 117 whereby it may be turned tight and for compressing a washer 118 disposed between the enlargement 117 and wall 33, to prevent leakage of material from one compartment to another.

In order that the freezer may be set to break the motor circuit when the desired temperature has been attained in the cavity 29, i. e., when the edible mixture has been frozen to the desired degree, and to permit a range of adjustment, the means 92 is provided. It comprises a nut 119 swiveled to the switch casing; a threaded stem 120, revoluble in the openings 40 and 57, having the screw threaded engagement with nut 119; and a knob 121 on stem 120 at the exterior of the container 15, the stem being held against longitudinal movement by the knob 121 and a collar 122 on the stem, bearing against the inner face of wall 37. The outer face of the support 16 may carry delineations 123, as shown in Fig. 2, to facilitate positioning a pointer 124 of the knob at the selected graduation in the well known manner, to bring about the desired adjustment. Thus, if the pointer is swung to the left, the threaded portion of stem 120 will feed the nut 119 toward wall 33, and move the switch unit toward that wall. Consequently a lower temperature will be required in the chamber 29, before the thermostat plunger 91 will be retracted sufficiently to permit the contact arm 86 of the switch to break the circuit than if the pointer is at one of the graduations to the right.

Means 93 is provided to cooperate with the actuating arm 88 to close the motor circuit even tho the low temperature in chamber 29 has been satisfied and the thermostatic means 90 has caused the motor circuit to become broken. Thus by use of means 93, the motor 20 may be used to express the frozen mixture from chamber 29 as previously described. The means 93 preferably comprises a stem 125 reciprocable in a casing 126 secured to the support 16 and wall 37 by a screw 127 and accommodated in the openings 41 and 58; a spring operated detent 128 in the casing 126 which may enter either of annular grooves 129 and 130 in the stem 125; a knob 131 on the outer end of the stem; and, a head 132 on the inner end of the stem. The stem extends thru the notch 104 between the tines 103 of actuating arm 88. The stem 125 is sufficiently long that when the detent 128 is in groove 129, the head 132 is sufficiently remote from the tines 103 that it will not interfere with adjustment of the switch unit 85, thru means 92. However, if a pull is exerted on knob 131 to draw the stem outwardly, so that the detent is disposed in groove 130, then the head 132 will have engaged the tines 103 and actuated the arm 88 to the extent that it will have depressed the switch plunger 87 and completed the motor circuit, irrespective of the position of the plunger 91 of thermostatic means 90.

In Figs. 1, 5 and 11, the elements of means 93 are shown in position to permit the thermostatic means 90 to make and break the motor circuit. In Fig. 12, the knob 131 and stem 125 are shown in an outward position, for completing the motor circuit even tho the mixture in chamber 29 is frozen to the desired extent, but so as to express the mixture from the chamber by use of the agitator 19.

The stand 23, shown in Figs. 12 and 13 may be conveniently formed of wire and includes arcuate saddle portions 133 for engaging the lower portion of cylinder 24 adjacent its ends; standards 134 at the ends of the saddles 133; and longitudinally extending base portions 135 joining the lower ends of the standards 134 at each side of the stand. The stand may be made sufficiently high to permit a tray or plate not shown in the drawing, to be slipped beneath the egress end of cylinder 24 so that the frozen mixture may be cut into portions, if desired, as it is forced out of the chamber 29.

The wiring is very simple as shown in Fig. 14. A plug 136 shown in Fig. 1 may be provided for "plugging-in" the circuit in the usual way. Wires 137 and 138 from the plug may be let into the housing of motor 20, the former going directly to a brush 139 of the motor and the other to the terminal 140 of switch unit 85 thru opening 42. A third wire 141 leads from the contact 97 of the switch unit 85 thru opening 42 to the other brush 142 of the motor.

It is believed the operation of the freezer is clear from the foregoing description. However it is pointed out that, at room temperature, the substance 111 in sack 110 is expanded sufficiently to cause the plunger 91 to close the switch of the motor circuit. Hence, the agitator 19 starts to rotate as soon as there is electric current available as by plugging-in plug 136. As the temperature in chamber 29 becomes lower the substance 111 contracts until finally the plunger 91 is moved responsive to action of spring 113 to a position where the spring 96 of the switch unit causes the motor circuit to be broken. If for some reason the temperature in chamber 29 again becomes higher, the motor circuit may again become closed by expansion of the substance 111. When it is desired to eject the frozen mixture from chamber 29 the end cap 26 is removed, and the motor started by operating means 93.

It is of course understood that any suitable type of bearing 35 may be provided to prevent passage of fluid from chamber 29 to chamber 34 and from the latter to the former. The chamber 34 may contain any desirable type of lubricant.

While I have herein referred to the apparatus as an ice cream freezer, it is of course understood that the apparatus may be used for freezing various edible mixtures in addition to compositions from which ice cream is made, the apparatus being readily adjustable as to automatic shut-off at various selected temperatures and not dependent upon resistance to movement of the agitator for breaking of the motor circuit or rendering the motion transmitting means between the motor and agitator inoperative.

I claim:

1. In a freezer for edible mixtures, the combination of a container for the edible mixture comprising a hollow cylindrical main body, end caps each having screw threaded detachable connection with said main body and compressible gaskets carried by said caps for engagement with the ends of the main body; a support carried by one of said caps and having fixed relation thereto, for supporting one end portion of said container upon a surface; and, a support carried by the other of said caps and adjustable about the axis of said body portion, for supporting the other end portion of the container upon a flat surface, said last mentioned support permitting adjustment for stable support of the container in a horizontal position and to compensate for wear or the degree of compression of said gaskets resulting from removal and replacing of the caps with respect to the main body portion.

2. In a freezer for edible mixtures, the combination of an elongated container having a cylindrical cavity for receiving the edible mixture and including a detachable end cap; a screw agitator in said container constructed and arranged to circulate the edible mixture mainly in a direction longitudinally of the container; an electric motor; motion transmitting means operatively connected with said motor and agitator for imparting movement of the former to the latter; a normally open electric switch for making and breaking the electric circuit of said motor; thermostatic means influenced by the temperature in said container to close said switch when the temperature in said container is higher than that desired for the mixture therein and to permit the switch to open when the desired temperature is attained; and, manually operable means for closing said switch independently of said thermostatic means, whereby the motor may be used, when said end cap is detached, for operating said screw agitator to express the frozen mixture from the container.

3. In a freezer for edible mixtures, the combination of an elongated container having a cavity for receiving the edible mixture, including a detachable end cap; a screw agitator in said cavity constructed and arranged to circulate the edible mixture mainly in a direction longitudinally of the container; an electric motor; motion transmitting means operatively connected with said motor and agitator for imparting movement of the former to the latter; and control mechanism for said electric motor comprising thermostatic means including an element movable as a result of temperature changes in said cavity, manually movable means, a normally open electric switch, and means operatively engaged by said movable element of said thermostatic means and by said manually movable means to close said switch thru the influence of said thermostatic means only when the temperature in said container is higher than that desired for the mixture therein, and to close said switch thru the influence of said manually movable means independently of said thermostatic means, to express the frozen edible mixture from said cavity thru operation of said motor, transmission and screw agitator, when said end cap is detached from the container.

4. In a freezer for edible mixtures, the combination of an elongated container having a cavity for receiving the edible mixture, including a detachable end cap; a screw agitator in said cavity constructed and arranged to circulate the edible mixture mainly in a direction longitudinally of the container; an electric motor; motion transmitting means operatively connected with said motor and agitator for imparting movement of the former to the latter; and a thermostatic and manually operable electric switch mechanism for the motor circuit adapted to thermostatically complete the circuit only when the temperature in said container is higher than that desired, and adapted to be manually operated to complete the circuit when the desired temperature in said container has been attained, to express the frozen edible mixture from said cavity thru operation of said motor, transmission and screw agitator, when said end cap is detached from the container.

5. In a freezer for edible mixtures, the combination of an elongated container having a cavity for the edible mixture, comprising a body portion, a detachable rear end cap, and a front end cap including a closing wall and an instrument wall spaced therefrom to provide a screw instrument chamber; an agitator in said cavity, constructed and arranged to circulate the edible mixture mainly in a direction longitudinally of the container; an electric motor; motion transmitting means operatively connected with said motor and agitator to impart movement of the former to the latter; a switch for the motor circuit including a contact arm, normally spring biased to a first open circuit position and movable to a second closed circuit position, and a plunger extending toward said closing wall for actuating said contact arm to said second position when depressed; means mounting said switch in said chamber to be bodily movable toward and from said closing wall; an actuating arm movably carried by said switch and bearing against the said plunger; a thermostatic means carried by said closing wall and including a plunger bearing against said actuating arm at its face opposite that face which engages said switch plunger, and responsive to temperature changes in said cavity, adapted to be projected when the temperature is high, and retracted as the temperature lowers; means carried by said instrument wall for bodily adjusting said switch and actuating arm toward and from said thermostatic means whereby to regulate the breaking of the motor circuit when the desired temperature in said cavity has been attained, and means carried by said instrument wall for manually imparting movement to said actuating arm for closing the motor circuit, irrespective of said thermostatic means, to express the frozen edible mixture from said cavity thru operation of said motor, transmission and screw agitator, when said end cap is detached from the container.

6. In a freezer for edible mixtures, the combination of a container having a cavity for the edible mixture and including a closing wall and an instrument wall spaced therefrom to provide an instrument chamber; an agitator in said cavity constructed and arranged to circulate the edible mixture therein; an electric motor; motion transmitting means operatively connected with said motor and agitator to impart movement of the former to the latter; a switch for the motor circuit including a contact arm normally spring biased to a first open circuit position and movable to a second closed circuit position, and a plunger extending toward said closing wall for actuating said contact arm to said second position when depressed; means mounting said switch in said chamber to be bodily movable toward and from said closing wall; an actuating arm movably carried by said switch and bearing against the said plunger; a thermostatic means carried by said closing wall and including a plunger bearing against said actuating arm at its face opposite that face which engages said switch plunger, and responsive to temperature changes in said cavity, adapted to be projected when the temperature is high, and retracted when the temperature lowers; and means carried by said instrument wall for bodily adjusting said switch and actuating arm toward and from said thermostatic means whereby to regulate the breaking of the motor circuit when the desired temperature in said cavity has been attained.

LESTER N. YOHE.

REFERENCES CITED

The following references are of record in the file of this patent:

UNITED STATES PATENTS

| Number | Name | Date |
|---|---|---|
| 749,286 | Gerner | Jan. 12, 1904 |
| 1,981,010 | Torson | Nov. 20, 1934 |
| 2,036,217 | Jordan | Apr. 7, 1936 |
| 2,085,160 | Kaup et al. | June 29, 1937 |
| 2,125,693 | Ralph, Jr. | Aug. 2, 1938 |
| 2,209,979 | Johnson | Aug. 6, 1940 |